(12) United States Patent
Shany et al.

(10) Patent No.: US 9,325,458 B2
(45) Date of Patent: Apr. 26, 2016

(54) BACKOFF ADAPTATION FOR DIGITAL COMMUNICATION SYSTEMS WITH CHANNEL QUALITY INFORMATION

(71) Applicant: Celeno Communications Ltd., Ra'anana (IL)

(72) Inventors: Yaron Shany, Kfar Saba (IL); Nir Shapira, Ra'anana (IL); Oren Hencinski, Holon (IL); Shmuel Vagner, Ra'anana (IL); Amir Helfan, Tel Aviv (IL); Ram Zamir, Tel Aviv (IL)

(73) Assignee: Celeno Communications Ltd., Ra'anana (IL)

( * ) Notice: Subject to any disclaimer, the term of this patent is extended or adjusted under 35 U.S.C. 154(b) by 0 days.

(21) Appl. No.: 14/182,322

(22) Filed: Feb. 18, 2014

(65) Prior Publication Data

US 2014/0161045 A1 Jun. 12, 2014

Related U.S. Application Data

(63) Continuation of application No. 13/036,695, filed on Feb. 28, 2011, now Pat. No. 8,654,825.

(60) Provisional application No. 61/308,959, filed on Feb. 28, 2010, provisional application No. 61/312,553, filed on Mar. 10, 2010.

(51) Int. Cl.
*H04W 4/00* (2009.01)
*H04L 1/20* (2006.01)
*H04L 1/00* (2006.01)

(52) U.S. Cl.
CPC .............. *H04L 1/20* (2013.01); *H04L 1/0003* (2013.01); *H04L 1/0009* (2013.01); *H04L 1/0015* (2013.01); *H04L 1/0026* (2013.01); *H04L 1/0035* (2013.01)

(58) Field of Classification Search
CPC ....... H04L 1/20; H04L 1/0009; H04L 1/0003; H04L 1/0026; H04L 1/0035; H04L 1/0015
USPC .......................................................... 375/224
See application file for complete search history.

(56) References Cited

U.S. PATENT DOCUMENTS 8,300,716 B1 * 10/2012 Lee et al. .................. 375/260
2006/0255989 A1  11/2006 Kim et al.
(Continued)

FOREIGN PATENT DOCUMENTS

WO  WO 2009/024555  2/2009

OTHER PUBLICATIONS

Office Action for U.S. Appl. No. 13/036,695 mailed Dec. 14, 2012.
(Continued)

*Primary Examiner* — Erin File
(74) *Attorney, Agent, or Firm* — Pearl Cohen Zedek Latzer Baratz LLP

(57) ABSTRACT

System and method for backoff correction of channel quality information (CQI). A correction factor is calculated based on a goodness measure such as packet error rate (PER). The selection of modulation and coding scheme (MCS) is made considering the channel quality information (CQI) adjusted by the correction factor. A meaningful goodness measure can be imposed if the goodness measure is very low. A different correction factor can be calculated for different confidence levels, MCSs and transmission modes.

31 Claims, 8 Drawing Sheets

(56) References Cited

U.S. PATENT DOCUMENTS

| | | | |
|---|---|---|---|
| 2007/0218917 A1* | 9/2007 | Frederiksen et al. | 455/450 |
| 2008/0159192 A1* | 7/2008 | Lee et al. | 370/310 |
| 2008/0159203 A1* | 7/2008 | Choi et al. | 370/328 |
| 2008/0214119 A1* | 9/2008 | Calvanese Strinati | 455/67.13 |
| 2008/0310400 A1* | 12/2008 | Cai et al. | 370/352 |
| 2009/0041088 A1 | 2/2009 | Yang et al. | |
| 2009/0061887 A1* | 3/2009 | Hart et al. | 455/450 |
| 2009/0073922 A1* | 3/2009 | Malladi et al. | 370/328 |
| 2009/0086657 A1* | 4/2009 | Alpert et al. | 370/310 |
| 2009/0141673 A1* | 6/2009 | Hwang et al. | 370/328 |
| 2009/0238123 A1* | 9/2009 | Kuri et al. | 370/329 |
| 2010/0091894 A1* | 4/2010 | Maltsev et al. | 375/260 |
| 2010/0128614 A1* | 5/2010 | Kuusela et al. | 370/252 |
| 2010/0195749 A1* | 8/2010 | Kimura et al. | 375/260 |
| 2010/0220683 A1* | 9/2010 | Novak et al. | 370/330 |
| 2011/0096708 A1* | 4/2011 | Novak et al. | 370/311 |
| 2011/0110251 A1* | 5/2011 | Krishnamurthy et al. | 370/252 |
| 2011/0183672 A1* | 7/2011 | Jeong et al. | 455/436 |
| 2012/0113942 A1* | 5/2012 | Kim | 370/329 |
| 2012/0155519 A1* | 6/2012 | Futagi et al. | 375/219 |
| 2012/0243473 A1* | 9/2012 | Kadous et al. | 370/328 |

OTHER PUBLICATIONS

International Preliminary Report on Patentability of PCT International Application No. PCT/IL2011/000199, dated Sep. 13, 2012.

International Search Report of PCT International Patent Application No. PCT/IL2011/000199, dated Jul. 7, 2011.

Kamerman et al., "WaveLan-II: A High Performance Wireless LAN for the Unlicensed Band," Bell Labs Technical Journal, pp. 118-133, Summer 1997.

Tsai et al. "Effective-SNR Mapping for Modeling Frame Error Rates in Multiple-State Channels," 3rd Generation Partnership Project 2, 3 GPP-C30-20030429-010. Apr. 29, 2003.

IEEE—Std 802.11, 1999 Edition (ISO/IEC 8802-11:1999); Part 11: Wireless LAN Medium Access Control (MAC) and Physical Layer (PHY) Specifications; Aug. 20, 1999.

IEEE—Std 802.11b-1999 Supplement to 802.11-1999 Wireless LAN MAC and PHY Specifications: Higher Speed Physical Layer (PHY) Extension in the 2.4 GHz Band, Sep. 16, 1999.

IEEE—Std 802.11n-2009; Part 11: Wireless LAN Medium Access Control (MAC) and Physical Layer (PHY) Specifications; Amendment 5: Enhancements for Higher Throughput; Oct. 29, 2009.

Kant et al., "Fast Link Adaptation for IEEE 802.11n", Master's Thesis, The Faculty of Engineering and Science, Aalborg University, 2007. Available on-line in http://kom.aau.dk/~tlj/Fast%20Link%20Adaptation%20for%20IEEE%20802.11n.pdf.

IEEE—Std 802.11a-1999, Part 11: Wireless LAN Medium Access Control (MAC) and Physical Layer (PHY) specifications: High Speed Physical Layer (PHY) in the 5 GHz Band; Sep. 16, 1999.

* cited by examiner

BACKOFF ADAPTATION FOR DIGITAL COMMUNICATION SYSTEMS WITH CHANNEL QUALITY INFORMATION

CROSS-REFERENCE TO RELATED APPLICATIONS

This application is a continuation of U.S. application Ser. No. 13/036,695 filed on Feb. 28, 2011 which claims the benefit of U.S. Provisional Application No. 61/308,959, filed on Feb. 28, 2010 and of U.S. Provisional Application No. 61/312,553, filed on Mar. 10, 2010, the entire contents of which are incorporated herein by reference.

FIELD OF THE INVENTION

The present invention relates to the field of wireless communication. In particular, embodiments of the present invention relate to a method for correcting channel quality information estimation for the selection of modulation and coding scheme.

BACKGROUND OF THE INVENTION

In digital communication systems that support several modulation and coding schemes (MCS), the transmitter may have a method for dynamically selecting MCS. The problem of dynamic MCS selection is of special interest in wireless communication systems, where the channel may significantly change over time. For simplicity, the term MCS is used throughout this application to encapsulate the combination of modulation and coding scheme (MCS) as well as sampling rate, bandwidth, number of spatial streams, etc. Two distinct combinations are considered as two different MCS even if they result in the same number of data bits per second.

Typically, it is desirable for a transmitter to work at, or close to, the maximum possible transmission rate $r_{max}$ of the channel instance, in order to maximize the system throughput. However, working near the maximum transmission rate may be risky. In typical wireless systems, choosing a transmission rate above $r_{max}$ may result in high packet error rate (PER), which in turn may result in an undesired goodput loss.

Many current MCS selection methods fall in the category of PER-based trial and error. Basically, assuming that the transmitter has some short term estimation of PER, MCS is changed such that the transmission rate increases if PER is low enough and changed such that the transmission rate decreases if PER is too high. A more sophisticated method of this type is known as the Auto Rate Feedback. While simple, these methods have relatively poor performance because of their slow settling time, and because they may require long high-PER phases for convergence.

Fast link adaptation methods require that the transmitter have some knowledge of dynamic channel quality information (CQI), e.g., an estimation of signal to noise ratio (SNR) or an effective SNR, for MCS selection. To that matter, CQI may also refer to quantized SNR, or even to MCS recommendation feedback from a receiver, such as that of the fast link adaptation (FLA) mechanism of the IEEE 802.11n standard. Each supported MCS is related to a level of throughput and has a minimum required channel quality. The transmitter chooses the MCS with the highest throughput for which the current quality is above the minimum required quality. Clearly, the performance of fast link adaptation methods relies, inter alia, on the accuracy of the estimated channel quality. If, for example, SNR is used as CQI, then an error in order of 1-2 dB in the estimation of SNR may dramatically increase PER.

SUMMARY OF THE INVENTION

According to embodiments of the present invention, there may be provided a method for backoff correction of channel quality information (CQI). The method may include obtaining a goodness measure estimation, calculating a correction factor based on the goodness measure, and using CQI adjusted by the correction factor for selection of modulation and coding scheme (MCS).

Furthermore, according to embodiments of the present invention, the method may include calculating the correction factor by: storing a plurality of tables each describing channel quality dependency on the goodness measure for one of the MCSs, obtaining current CQI for current MCS at substantially the same time as the goodness measure estimation, estimating channel quality based on the goodness measure estimation and on a table from the plurality of tables corresponding to the current MCS to get unbiased channel quality estimation, and calculating the correction factor by subtracting the unbiased channel quality estimation from the current CQI.

Furthermore, according to embodiments of the present invention, the method may include calculating the correction factor based on a previous value of the correction factor and on a correction function relating correction factor changes to goodness measure estimations.

Furthermore, according to embodiments of the present invention, the method may include having a corresponding correction function for each MCS.

Furthermore, according to embodiments of the present invention, the correction function may be in the form of increasing the correction factor by a first constant if the goodness measure estimation may be above the first threshold, decreasing the correction factor by a second constant if the goodness measure estimation may be below the second threshold and leave the correction factor unchanged otherwise.

Furthermore, according to embodiments of the present invention, a goodness measure level may be imposed in case the goodness measure estimation substantially equals a minimal goodness measure level, the minimal goodness measure related to MCS having transmission rates below a maximum supported transmission rate.

Furthermore, according to embodiments of the present invention, the goodness measure level may be imposed by decreasing the correction factor.

Furthermore, according to embodiments of the present invention, the goodness measure level may be imposed by reducing transmission power.

Furthermore, according to embodiments of the present invention, the method may include stopping to impose the goodness measure level prior to changing the MCS, and reducing the correction factor by a predetermined value if the goodness measure estimation substantially equals a minimal goodness measure level, the minimal goodness measure related to MCS having transmission rates below a maximum supported transmission rate when a timer expires.

Furthermore, according to embodiments of the present invention, the selection of MCS may be performed based on CQI obtained with non-decreased transmission power.

Furthermore, according to embodiments of the present invention, the method may further include assigning confidence levels to packets, assigning a corresponding safety guard to each of the confidence levels, and adding the safety guard to the correction factor.

Furthermore, according to embodiments of the present invention, the method may further include imposing goodness measure level in case the goodness measure estimation substantially equals a minimal goodness measure level, the minimal goodness measure related to MCS having transmission rates below a maximum supported transmission rate while transmitting packets with low confidence level.

Furthermore, according to embodiments of the present invention, the goodness measure may be selectable from a list comprising: packet error rate (PER) and a combination of the PER and throughput.

Furthermore, according to embodiments of the present invention, a plurality of the correction factors may be calculated and used, each for a corresponding transmission mode.

Furthermore, according to embodiments of the present invention, the method may further include calculating and using a plurality of the correction factors, each for a corresponding MCS.

Furthermore, according to embodiments of the present invention, the method may further include filtering the correction factor.

Furthermore, according to embodiments of the present invention, the method may further include allowing goodness measure levels that result in data loss in pre-defined periods in which valuable data may be not transmitted.

According to embodiments of the present invention there may be provided system for backoff correction of channel quality information (CQI). The system may include a CQI estimation module that may obtain CQI, a backoff adaptation module that may get a goodness measure estimation and may calculate a correction factor based on the goodness measure, and a modulation and coding scheme (MCS) selection module that may use the CQI adjusted by the correction factor for selection of MCS.

Furthermore, according to embodiments of the present invention, wherein the backoff adaptation module may calculate the correction factor by storing a plurality of tables each describing channel quality dependency on the goodness measure for one of the MCSs, obtaining current CQI from the CQI estimation module for current MCS at substantially the same time as the goodness measure estimation, estimating channel quality based on the goodness measure estimation and on a table taken from the plurality of tables corresponding to the current MCS to get unbiased channel quality estimation, and calculating the correction factor by subtracting the unbiased channel quality estimation from the current CQI.

Furthermore, according to embodiments of the present invention, the backoff adaptation module may calculate the correction factor based on a previous value of the correction factor and on a correction function relating correction factor changes to goodness measure estimations.

Furthermore, according to embodiments of the present invention, each MCS may have a corresponding correction function.

Furthermore, according to embodiments of the present invention, the correction function may be in the form of increasing the correction factor by a first constant if the goodness measure estimation may be above the first threshold, decreasing the correction factor by a second constant if the goodness measure estimation may be below the second threshold and leave the correction factor unchanged otherwise.

Furthermore, according to embodiments of the present invention, the backoff adaptation module may impose a goodness measure level in case the goodness measure estimation substantially equals a minimal goodness measure level, the minimal goodness measure related to MCS having transmission rates below a maximum supported transmission rate.

Furthermore, according to embodiments of the present invention, the backoff adaptation module may impose a goodness measure level by decreasing the correction factor.

Furthermore, according to embodiments of the present invention, the system may include at least one gain block that may amplify power of at least one signal transmitted by at least one antenna according to a control signal received from the backoff adaptation module, wherein the backoff adaptation module may impose a goodness measure level by changing the control signal and thus changing transmission power.

Furthermore, according to embodiments of the present invention, the backoff adaptation module may further stop imposing the goodness measure level prior to changing the MCS, and reduce the correction factor by a predetermined value if the goodness measure estimation substantially equals a minimal goodness measure level, the minimal goodness measure related to MCS having transmission rates below a maximum supported transmission rate when the timer expires.

Furthermore, according to embodiments of the present invention, the system may include Furthermore, according to embodiments of the present invention, the MCS selection module may use CQI obtained with non-decreased transmission power for the selection of MCS.

Furthermore, according to embodiments of the present invention, the backoff adaptation module may obtain confidence levels assigned to packets, assign a corresponding safety guard to each of the confidence levels, and add the safety guard to the correction factor.

Furthermore, according to embodiments of the present invention, the backoff adaptation module may impose goodness measure level in case the goodness measure estimation substantially equals a minimal goodness measure level, the minimal goodness measure related to MCS having transmission rates below a maximum supported transmission rate while transmitting packets with low confidence level.

Furthermore, according to embodiments of the present invention, the goodness measure may be selectable from a list comprising: packet error rate (PER) and a combination of the PER and throughput.

Furthermore, according to embodiments of the present invention, the backoff adaptation module may calculate and use a plurality of the correction factors, each for a corresponding transmission mode.

Furthermore, according to embodiments of the present invention, the backoff adaptation module may calculate and use a plurality of the correction factors, each for a corresponding MCS.

Furthermore, according to embodiments of the present invention, the system may include a filter to filter the correction factor.

Furthermore, according to embodiments of the present invention, the backoff adaptation module may impose a goodness measure levels that result in data loss in pre-defined periods in which valuable data may be not transmitted.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
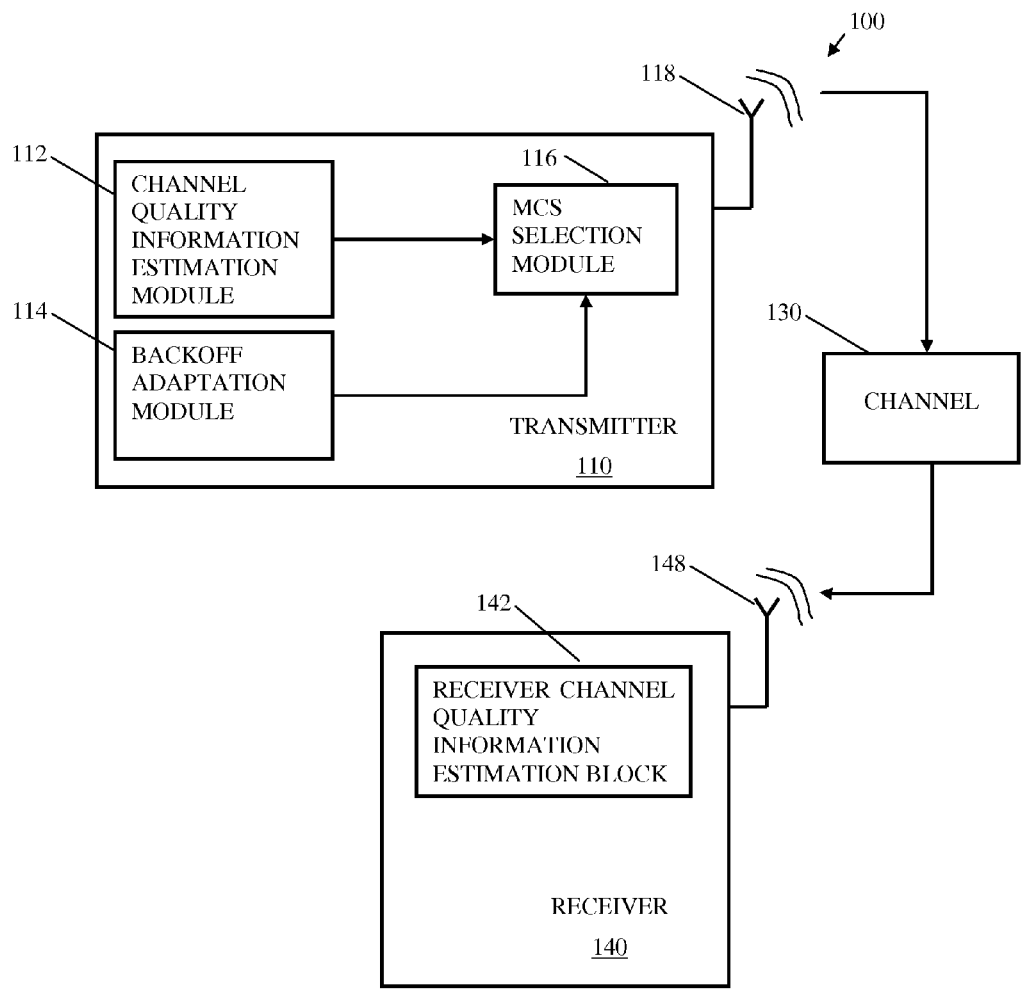
FIG. 1 schematically illustrates a module diagram of a wireless communication system utilizing backoff adaptation according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Throughout the specification PER values are presented in normalized values linearly ranging from 0 to 1 wherein 0 stands for no packet loss and 1 stands for 100% packet loss in a given time interval.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, "IEEE Std 802.11n-2009," IEEE 802.11ac standard (e.g., as described in "IEEE 802.11-09/0992r21") and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), a wide area network (WAN), or a global communication network, for example, the Internet.

According to embodiments of the present invention MCS selection at the transmitter may be based, inter alia, on channel quality. The channel quality may be seen as composed of two components: estimated CQI, also referred to as fast-varying component and a bias or error component. The bias may typically be substantially constant or slowly-varying component. The fast-varying component may depend on the dynamics of the physical channel. For example, the fast-varying component may change in case a person is walking between a transmitter and a receiver in a wireless system. The slowly-varying component may depend on constant unknown gains of amplifiers, slow gain variation of amplifiers with time, slow variation of receiver noise figure with time, etc.

According to embodiments of the present invention the fast-varying component of the channel quality may be estimated by the transmitter by measuring instantaneous CQI, for example, by estimating SNR or effective SNR, quantized SNR, or MCS recommendation feedback from a receiver, such as that of the fast link adaptation (FLA) mechanism of the IEEE 802.11n standard. The slowly-varying component, however, may be seen as a bias or error in the estimation of CQI.

Thus, according to embodiments of the present invention the estimation of CQI, e.g., SNR or effective SNR made by the transmitter may include an error component that may vary with time. For example, SNR or effective SNR may be estimated during a training sessions in which the receiver transmits known data sets to the transmitter, e.g., as in the implicit feedback mode of the 802.11n standard. SNR, or effective SNR, may be estimated by the transmitter based on the received data as well as on receiver characteristics such as uplink TX power and noise figure of the receiver. Since the receiver characteristics are typically not known to the transmitter, the transmitter makes assumptions of these receiver characteristics. Errors in the assumptions of the TX power and the noise figure of the receiver may cause an error in the estimation of CQI. Since the TX power and the noise figure may change slowly with time, the error in the estimation of CQI may vary slowly with time as well. Alternatively, CQI may be estimated by the receiver and reported to the transmitter in a control channel, as in the explicit feedback mode of the 802.11n standard, or in the fast link adaptation (FLA) mechanism of the 802.11n standard, where returned MCS recommendations may be considered as quantized SNR feedback, or in the link adaptation mechanism of 802.1ac, where the receiver returns both MCS and SNR, and the CQI is therefore a combination of both. If the receiver bases the calculation on an RX power measurement, then the receiver has to have some assumptions on its own noise figure. Again, an error in the assumption of the receiver noise figure can cause an error or bias in the assumption of CQI.

As known to these skilled in the art, in many practical situations the main bulk of error in the estimation of CQI may be constant or may vary slowly with time, with relation to changes in CQI According to embodiments of the present invention the bias or error in the estimation of CQI can be compensated by adding an appropriate correction factor, also referred to as backoff, B, to the estimated CQI, therefore receiving corrected CQI, $q_{corr}$.

Reference is made to FIG. 1 which schematically illustrates a module diagram of a wireless communication system 100 utilizing backoff adaptation according to embodiments of the present invention. According to embodiments of the present invention, system 100 may comprise a transmitter 110 transmitting data to receiver 140 through wireless communication channel 130. Transmitter 110 and receiver 140 may include, for example, a wireless communication station or a wireless communication device able to transmit and/or receive wireless communication signals. It should be noted that while transmitter 110 and receiver 140 are presented with relation to the main data transmission direction in a given session, both stations may have transition and reception capabilities.

According to embodiments of the present invention, transmitter 110 may include a MCS selection module 116, a CQI estimation module 112, backoff adaptation module 114 and antenna 118.

MCS selection module 116 may be adapted to set MCS based on a $q_{corr}$. For example, MCS selection module 116 may hold a table relating supported MCSs with minimum required channel quality. MCS selection module 116 may choose the MCS with substantially maximum throughput for which current $q_{corr}$ is above the respective minimum required quality.

CQI estimation module 112 may estimate CQI by any applicable method, as known in the art. For example, CQI estimation module 112 may estimate CQI by initiating training sessions in which receiver 140 may transmit known data sets to transmitter 110, as in the implicit feedback mode of the IEEE 802.11n standard. CQI estimation module 112 may estimate CQI based on the received data as well as on characteristics of receiver 140 such as TX power and noise figure of receiver 140. As mentioned above, the characteristics of receiver 140 are typically not known to CQI estimation module 112, and thus, CQI estimation module 112 may make assumptions of these characteristics. Errors in the assumptions of the TX power and the noise figure of receiver 140 may cause an error in the estimation of CQI. Alternatively, CQI estimation module 112 may receive CQI estimations made by receiver CQI estimation module 142 and transmitted over channel 130, as in the explicit feedback mode of the 802.11n standard.

According to embodiments of the present invention, receiver 140 may include a receiver CQI estimation module 142, and antenna 148. Receiver CQI estimation module 142 may estimate CQI by, for example, training sessions in which transmitter 110 may transmit known data sets to receiver 140. Receiver CQI estimation module 142 may estimate CQI based on the received data as well as on characteristics of receiver 140 such as the noise figure of receiver 140. As mentioned above, the noise figure of receiver 140 is typically not known to receiver CQI estimation module 142, and thus, receiver CQI estimation module 142 may make assumptions of its own noise figure. Errors in the assumption of the noise figure of receiver 140 may cause an error in the estimation of CQI. Receiver 140 may transmit the CQI estimation of CQI estimation module 142 to transmitter 110, and this CQI estimation may serve as the input to MCS selection module 116 instead of the output of channel quality information estimation module 112.

Although the invention is not limited in this respect, antennas 118, 148 may include, for example, a set of N antennas. Antennas 118, 148 may include, for example, an internal and/or external RF antenna, e.g., a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, modules, frames, transmission streams, packets, messages and/or data.

According to embodiments of the present invention backoff adaptation module 114 is adapted to obtain goodness measure estimations, for example PER estimations, and calculate time dependant estimation of the backoff, B, based on the goodness measure. Backoff adaptation module 114 may be implemented using any suitable combination of memory, hardwired logic, and/or general-purpose or special-purpose processors, as is known in the art.

PER estimation may be obtained in many different ways. For example, in systems supporting an acknowledgement protocol, transmitter 110 may compare the number of acknowledged packets to the total number of transmitted packets. It should be noted that PER is just one possible goodness measure for updating the backoff, and the backoff updates may be based on many other goodness measures e.g., a combination of PER and throughput. For simplicity, PER will be used throughout the specification to mean any such goodness measure.

According to embodiments of the present invention in between updates of backoff, B, MCS selection module 116 may base MCS selection on the time varying value of CQI, $\hat{q}(t)$, adjusted by B. Specifically, MCS selection module 116 may use $$q_{corr}(t)=\hat{q}(t)-B, \quad (1)$$

instead of $\hat{q}(t)$ for MCS selection. It should be noted that in (1) as well as subsequent formulae the CQI and the backoff are given in dB units.

Figure 2:
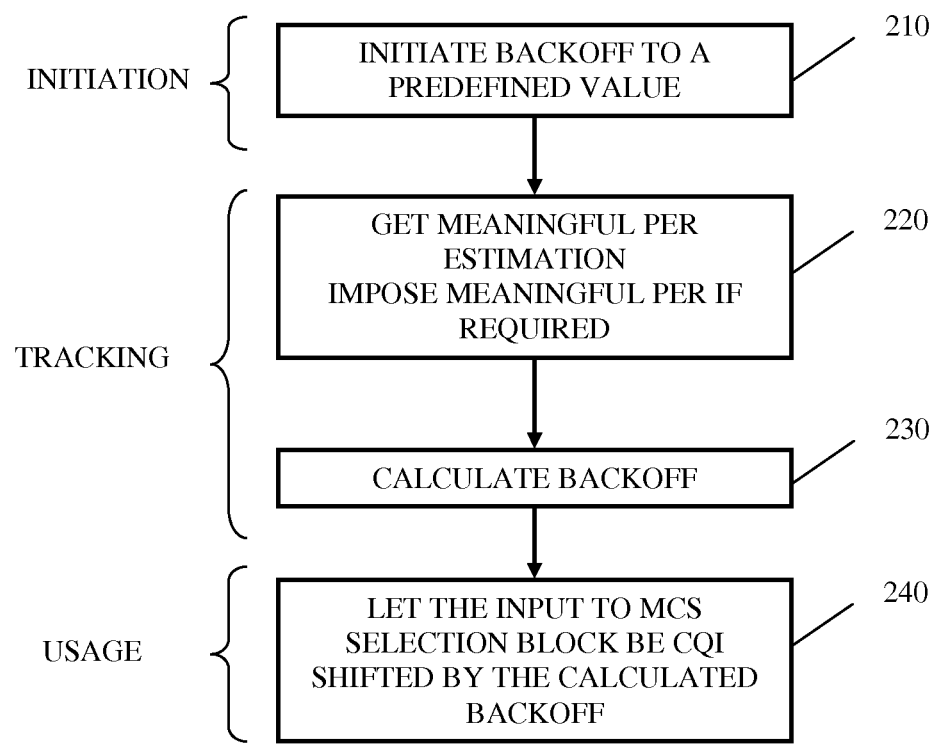
FIG. 2 is a flowchart illustration of a method for backoff correction of channel quality information (CQI) according to embodiments of the present invention.

Reference is now made to FIG. 2 which is a flowchart illustration of a method for backoff correction of CQI according to embodiments of the present invention. According to embodiments of the present invention, a predefined value of backoff, $B_{initial}$, may be initiated, as indicated in block 210. $B_{initial}$ may be calculated in a post-production calibration process, or alternatively may be set to a pre-estimated value based on any assumptions on the unknown parameters, such as the TX power of the receiver 140, the noise figure of the receiver 140, etc. Alternatively, $B_{initial}$ may be set to zero. During tracking phases, backoff B may be calculated based on PER estimations, as indicated in blocks 220 and 230. Exemplary methods for backoff calculations will be discussed in detail infra. At block 240 the input to MCS selection block may be set to CQI shifted or adjusted by the backoff, for example, according to equation 1. Although embodiments of the invention are not limited in this respect, the method depicted in FIG. 2 may be performed by embodiments of the present invention, for example, an embodiment as shown in FIG. 1.

According to embodiments of the present invention the backoff may be estimated using curve-based method. Typically, the system PER may be a function of channel quality, q, MCS, and additional transmission parameters such as packet length, demodulation method, decoding method, etc. To simplify notation, it is assumed that all these additional transmission parameters are fixed, and hence PER may be a function of channel quality and MCS. It follows that for each fixed MCS, PER may be a function of channel quality. Typically, this function may be invertible, and hence for each fixed MCS, channel quality may be presented as a function of PER. It should be noted that embodiments of the present invention are not limited to having the additional transmission parameters fixed and may include varying packet length, demodulation method, decoding method etc.

According to embodiments of the present invention a plurality of functions or tables describing channel quality dependency on PER for supported MCSs, $q_{MCS}(PER)$ may be held by or accessible from, for example, backoff adaptation module 114. For example, if SNR is used as channel quality indicator, q, then backoff adaptation module 114 may hold a plurality of functions or tables describing the SNR dependency on PER for supported MCS, $SNR_{MCS}(PER)$. According to embodiments of the present invention the functions or tables relating channel quality to PER for supported MCS, $q_{MSC}(PER)$ may be estimated or measured offline and stored, for example, in backoff adaptation module 114.

In typical digital communication systems, PER vs. SNR curves may have a steep "waterfall" shape. This means that typically, PER may be either nearly 0 for high SNR values, or nearly 1 for low SNR values with a slope in a subinterval $I \subset [0,1]$ of PER. Relating channel quality to PER requires working in the subinterval I of PER in which a measurable change in SNR will result in a measurable change in PER. Estimations of PER falling within subinterval I are referred to meaningful PER estimations throughout the specification. In practice, the subinterval of meaningful PER estimations may be affected by several factors, such as length of PER estimation window, PER floors due to impairments that are unaccounted for, sensitivity of the $q_{MCS}(PER)$ function to errors, etc. As a practical example, when PER is estimated based on several tens of packets, choosing I=[0.05,0.5] may give substantially good estimations of $q_{rate}(PER)$.

Figure 3:
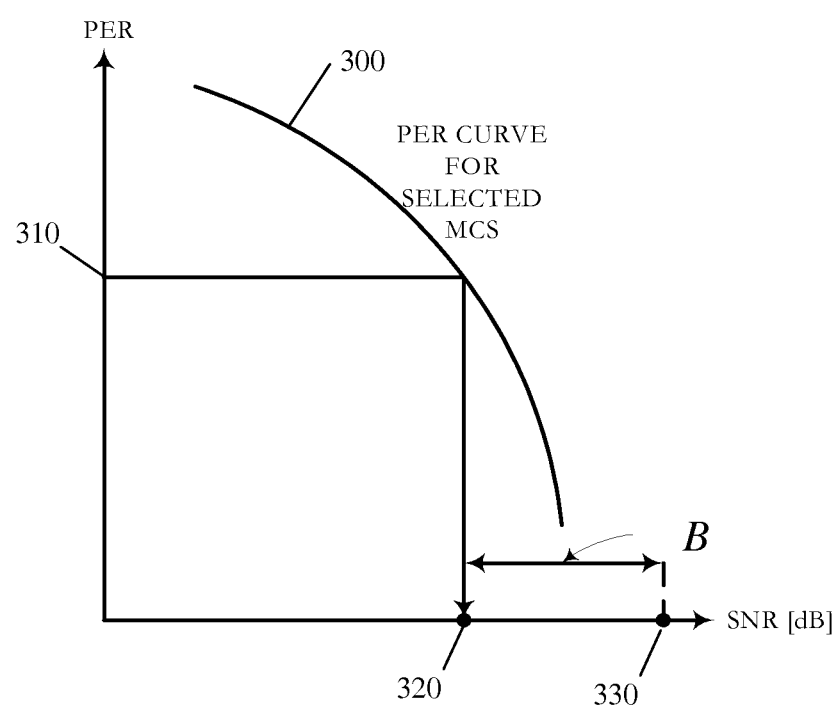
FIG. 3 schematically illustrates an exemplary curve relating packet error rate (PER) and signal to noise ratio (SNR) for a given rate according to embodiments of the present invention.

Reference is made to FIG. 3 which schematically illustrates an exemplary curve 300 relating PER and SNR for a given MCS according to embodiments of the present invention. Point 330 denotes estimated current CQI at time $t_0$, $\hat{q}(t_0)$, and point 310 denotes a current goodness measure such as meaningful PER estimation received at time $t_0$, $\hat{p}(t_0)$. Point 320 may be an unbiased channel quality estimation, $q_{MCS}(\hat{p}(t_0))$. According to embodiments of the present invention $q_{MCS}(\hat{p}(t_0))$ may be seen as an estimation of channel quality that includes the two components: estimated CQI, $\hat{q}(t_0)$, as well as the bias or error component. Thus, the backoff, B, may be related to the difference between $\hat{q}(t_0)$ and $q_{MCS}(\hat{p})$ such that $$B=\hat{q}(t_0)-q_{MCS}(\hat{p}(t_0)), \quad (2)$$

According to embodiments of the prevent invention, the backoff B obtained using Equation (2) may be further filtered. Such filtering may include FIR filtering, BR filtering etc. One example of IIR filtering is the use of a "forgetting factor" $\alpha$ to set $B_{i+1}=\alpha B+(1-\alpha)B_i$, where B is obtained from (2), $B_i$ may be a previous value of B, while $B_{i+1}$ may be a next value of B.

According to embodiments of the present invention the backoff may be estimated based on closed-loop backoff adaptation (CLBA) method. According to CLBA method PER may be tracked while MCS selection is based on the backoff-corrected CQI, and the backoff may be updated according to PER: When the PER is too high the backoff may be increased, while when the PER is sufficiently low the backoff may be decreased. According to CLBA, PER, which depends on the previous backoff, is fed-back to update the backoff. A correction function or $\hat{p} \mapsto \Delta B(\hat{p})$ relating the backoff change $\Delta B$ for a given PER estimation $\hat{p}$ may be stored, for example, at backoff adaptation module 114. The correction function or table may depend on MCS, such that different correction functions will be fitted to different MCSs. When a new PER estimation $\hat{p}$ is available, the backoff, B, may be updated according to:

$$B \leftarrow B_{prev}+\Delta B(\hat{p}). \quad (3)$$

Where $B_{prev}$ denotes the previous value of B.

Figure 4:
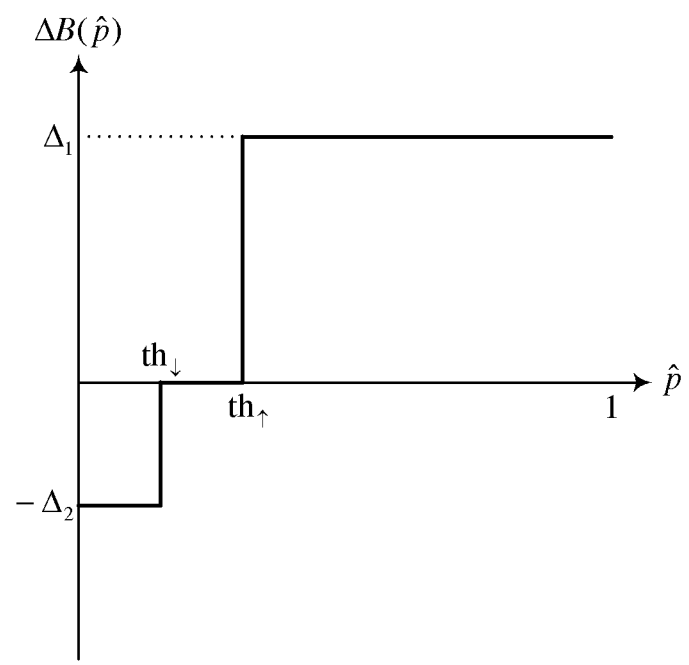
FIG. 4 schematically illustrates an exemplary correction function according to embodiments of the present invention.

Reference is made to FIG. 4 which schematically illustrates an exemplary correction function according to embodiments of the present invention. According to the correction function presented in FIG. 4 the backoff change may be a positive constant $\Delta_1$ if $\hat{p} \geq th_\uparrow$, a negative constant $(-\Delta_2)$, where $\Delta_2>0$, if $\hat{p} \leq th_\downarrow$, and zero otherwise. According to the correction function presented in FIG. 4 in some embodiments of the invention there may be no need for a table of values for describing function $\hat{p} \mapsto \Delta B(\hat{p})$; the constants $\Delta_1$, $\Delta_2$, $th_\uparrow$, $th_\downarrow$ may be sufficient. For a non-smooth correction function as that of FIG. 4, B may not change smoothly with time. However, B may jitter around a slowly varying, smooth function. It should be readily understood to those skilled in the art that many other correction functions or tables may be suitable.

Figure 5:
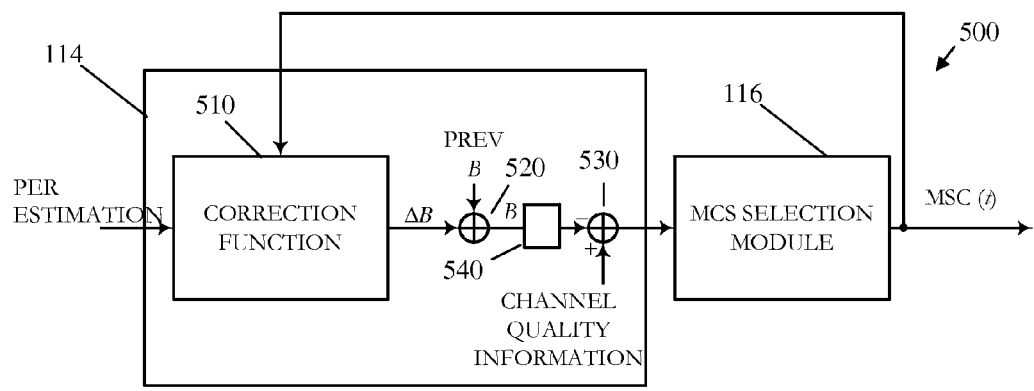
FIG. 5 schematically illustrates an exemplary block diagram of a module adapted to perform closed-loop backoff adaptation (CLBA) according to embodiments of the present invention.

Reference is made to FIG. 5 which schematically illustrates an exemplary block diagram of a module 500 adapted to perform CLBA according to embodiments of the present invention. Module 500 may include MCS selection module 116, and backoff adaptation module 114. Backoff adaptation module 114 may include correction function block 510, filter 540 and adders 520 and 530. According to embodiments of the present invention correction function block 510 may calculate backoff change $\Delta B$ based on PER estimate $\hat{p}$ and on the current MCS. Backoff change ΔB may be added to the previous value of backoff, Bprev, by adder 520 to get the current backoff value, B. The backoff, B, may be subtracted from time varying value of CQI, $\hat{p}(t)$, to get a $q_{corr}$ according to formula 1 by adder 530. MCS selection module 116 may get $q_{corr}$ for MCS selection.

According to embodiments of the prevent invention, the backoff B obtained after adder 520 may be further filtered before transferred to adder 530. Such filtering may include any known in the art low pass or band pass filtering such as FIR filtering, IIR filtering etc. One example of IIR filtering is the use of a "forgetting factor" α to set $B_{i+1} = \alpha B + (1-\alpha)B_i$, where B is obtained from adder 520, $B_i$ is a previous value of B fed to adder 530, while $B_{i+1}$ may be a next value of B fed to adder 530.

According to embodiments of the present invention a positive bias in $q_{corr}$ may be thought of as Optimism bias, since MCS selection module 116 mistakenly acts as if the channel quality is better than it really is. In this situation, MCS selection module 116 tends to select an MCS with overly high data transmission rate, resulting in increased PER levels. Thus, a positive bias in a $q_{corr}$ may manifest itself in the form of high PER. Moreover, the larger the positive bias in a $q_{corr}$, the larger the PER, since higher unsupported transmission data rates are chosen more frequently. A negative bias in $q_{corr}$, on the other hand, may be thought of as pessimism bias. In this case, MCS selection module 116 may tend to select MCS with transmission rates below the maximum supported rate.

According to embodiments of the present invention a positive bias in $q_{corr}$ may be corrected in the normal operation of backoff estimation. According to curve-based method, high levels of PER may simply result in a relatively high backoff. This may be true also for PER levels that are above the meaningful PER interval I. In case the PER is above the maximum meaningful PER, it may be treated as a meaningful PER and a corresponding backoff may be calculated. The backoff may continue to increase, until eventually the transmission rate may be low enough so that PER may be within the meaningful interval. According to CLBA method, high PER values may result in higher backoff values, based on the correction function. For example, according to the correction function presented in FIG. 4, PER values above $th_1$ may result in increase in B by $\Delta_1$.

According to embodiments of the present invention a negative bias in $q_{corr}$ may be overlooked since a negative bias in a $q_{corr}$ may result in a very low, for example, below 0.01, or substantially zero PER levels. For many communication systems, selecting MCS having the maximum supported transmission rate has substantially the same effect on PER as selecting MCS having transmission rates below the maximum supported transmission rate. Thus, negative bias in a $q_{corr}$ may be problematic since the transmitter may not use the available throughput and not get an indication of this via PER. To avoid situations of overlooked negative bias in $q_{corr}$, low levels of PER may be imposed during the tracking phase in order to distinguish between the case where the backoff is correct, and the case where the backoff is too high. Thus, low levels of PER may be imposed in case the goodness measure estimation substantially equals a minimal goodness measure level related to MCS having transmission rates below the maximum supported transmission rate. Such low levels of PER may be, for example, 0.05-0.1, that is 5 to 10 percent packet loss in a time interval. Keeping PER below 0.1 may enable most wireless protocols to compensate for the lost packets by, for example, retransmission.

According to CLBA method, situations of overlooked negative bias in $q_{corr}$ may be avoided, for example, by choosing a correction function that will decrease the backoff, B, in cases of low PER levels. For example, according to the correction function presented in FIG. 4, PER values below $th_1$ may result in decrease in B by $\Delta_2$. Such a correction may eventually impose PER, since the selected MCS may increase as long as the PER is too low.

According to curve-based method, situations of overlooked negative bias in $q_{corr}$ may be avoided, for example, by imposing PER in order to distinguish between the case where the backoff is correct, and the case where the backoff is too high. Imposing PER may be achieved by, for example, reducing the transmission power. Reduction in the transmission power may be achieved by several different techniques, such as digitally multiplying the baseband signal by an appropriate factor, digitally controlling analog power amplifiers, etc. Once the transmission power is low enough, PER may increase to the meaningful interval, and the backoff may be extracted.

Figure 6:
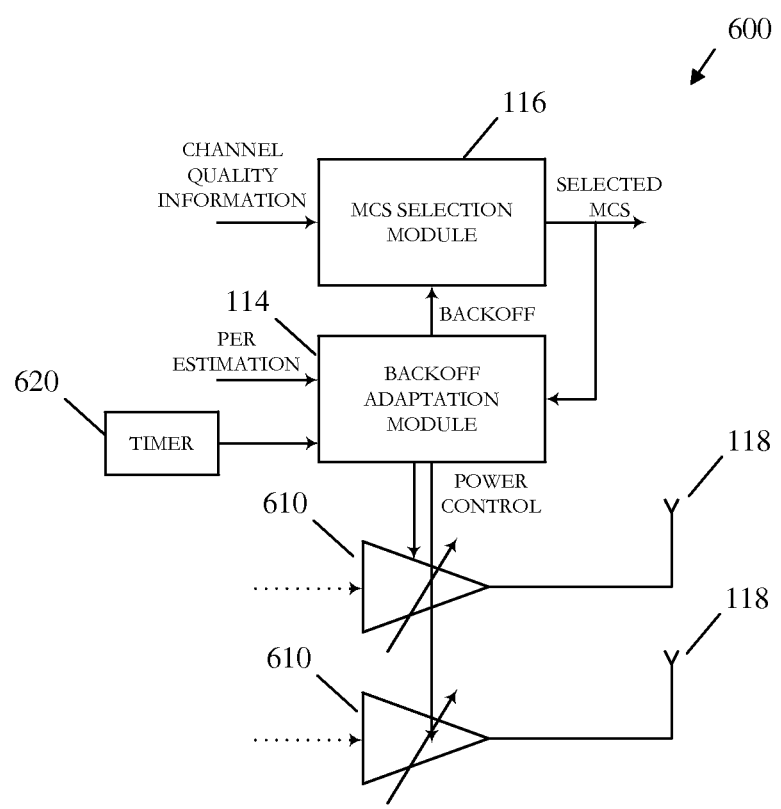
FIG. 6 schematically illustrates an exemplary block diagram of a transmitter capable of controlling transmission power during tracking phase according to embodiments of the present invention.

Reference is made to FIG. 6 which schematically illustrates an exemplary block diagram of a transmitter 600 capable of controlling transmission power during tracking phase according to embodiments of the present invention. According to embodiments of the present invention transmitter 600 may include a MCS selection module 116, backoff adaptation module 114 gain blocks 610 timer 620 and antennas 118. Each of gain blocks 610 may be connected to one of antennas 118 and may amplify the power of the signal transmitted by the antenna according to a control signal received, for example, from backoff adaptation module 114. Gain block 610 may include analog power amplifiers, may be implemented digitally or be a combination of both. According to embodiments of the present invention backoff adaptation module 114 may control the amplification level of gain blocks 610 by changing the control signal and thus may reduce and increase the transmission power as discussed above.

It should be noted that both CLBA and curve-based methods may impose PER by either decreasing the backoff or by decreasing the transmission power, or by any other applicable method. For example, decreasing the transmission power may be combined with decreasing the backoff. For example, transmission power may be reduced if PER levels are below a selected threshold. However, to avoid PER during MCS changes, it may be possible to stop imposing PER levels prior to changing the MCS, for example, by returning to full transmission power prior to MCS changes, for example backoff adaptation module 114 may impose full transmission power prior to MCS changes by changing the control signal of gain blocks 610, and then re-start the gradual power decrement in the new MCS. If CQI, and hence the selected MCS, change very rapidly, the system may not have sufficient time between MCS changes to reduce the power enough to get a meaningful PER. To overcome this problem, it is possible, e.g., to introduce a timer dependant reduction in the backoff. If there were no meaningful PER readings when timer 620 expires, the backoff may be reduced by a pre-defined value.

According to embodiments of the present invention to enable PER growth with power reduction, MCS selection module 116 should not receive indication of the power reduction, so that MCS selection module 116 will maintain the current MCS even when MCS selection module 116 would normally select a MCS with lower transmission rate with the lower power. This may apply to systems that consider also transmission power for the selection of MCS, as the transmission power directly effect $\hat{q}(t)$. Hence, MCS selection may be based on $\hat{q}(t)-B$ where $\hat{q}(t)$ is the channel quality with the original, non-decreased, power.

According to embodiments of the present invention, to get a fast estimation of the backoff, it is possible to allow higher values of PER, e.g., PER levels that may result in data loss, that is PER levels above the level easily corrected by the system by, for example, retransmission, for example, PER levels above 0.1, in pre-defined periods in which valuable data is not transmitted. Such a pre-defined period may be, for example, at system start-up. The pre-defined periods in which relatively high PER is allowed will be referred to as acquisition periods throughout the application. During acquisition periods, it may be possible to combine an MCS scan followed by power reductions in order to minimize the time required to get into the desired PER interval I. For example, during acquisition periods, the backoff adaptation module may work as follows:

1. Start transmission with some pre-defined MCS, e.g., the highest MCS, and decrease the MCS index until the first time the PER is within the desired interval I or below it.
2. If the PER at the final MCS is within I, then use the table corresponding to the final MCS to calculate the backoff.
3. Otherwise, if the PER at the final MCS is below I, start reducing power until the PER is within I or above it. Once the PER is within I or above it, use the table corresponding to the final MCS in order to calculate the backoff.

According to embodiments of the present invention an initial value of backoff, $B_{initial}$, may be calculated based on information gathered during a post-production calibration process. In post-production calibration process various quantities influencing the constant bias on $\hat{q}(t)$ may be measured or estimated, such as the receiver noise figure, the difference between the TX power of transmitter 110 and that of the receiver 140 in a reversed training session, etc. $B_{initial}$ may be set to compensate for the best post-production bias estimate. Alternatively, $B_0$ may be set to zero.

As mentioned above, in cases PER values are very low the transmitter may introduce low but meaningful PER level to distinguish between negative and zero bias in $\hat{q}(t)$ during the tracking phase. In some cases, it may be desirable that at least some of the packets transmitted with the highest quality possible, without deliberately introducing any level of errors. Thus, the packets may be divided into N confidence levels. Each confidence level i may be characterized by its own safety guard, $B_i$, $i \in \{0, \ldots, N-1\}$. Safety guard $B_i$ may be an additional, predetermined backoff level fitted to each confidence level, which may be used on top of the tracked backoff B. MCS selection module 116, when deciding on the MCS of packets of confidence level i, may use as the channel quality vector $q_{corr,i}$:

$$q_{corr,i} = \hat{q}(t) - B - B_i \quad (4)$$

To avoid introduction of errors while transmitting packets with high confidence level, meaningful PER levels may be induced, if needed, while transmitting packets with low confidence level. For example, meaningful PER levels may be induced during PER confidence level, also referred to as PER class. For ease of presentation, the PER class will be given index 0, so that $B_0$ corresponds to the PER class. Note that choosing $B_0 \neq 0$ will simply shift the tracked backoff B, and therefore $B_0$ may be set to 0. According to embodiments of the present invention, the backoff for packets in protection class 0, may be the backoff B calculated as described hereinabove, while packets in protection class i, $i \in \{1, \ldots, N-1\}$, may have higher backoff levels, depending on $B_i$. Backoff correction of CQI with confidence levels may be referred to as protected backoff correction of CQI. When N=1, protected backoff correction of CQI coincides with backoff correction of CQI.

Figure 7:
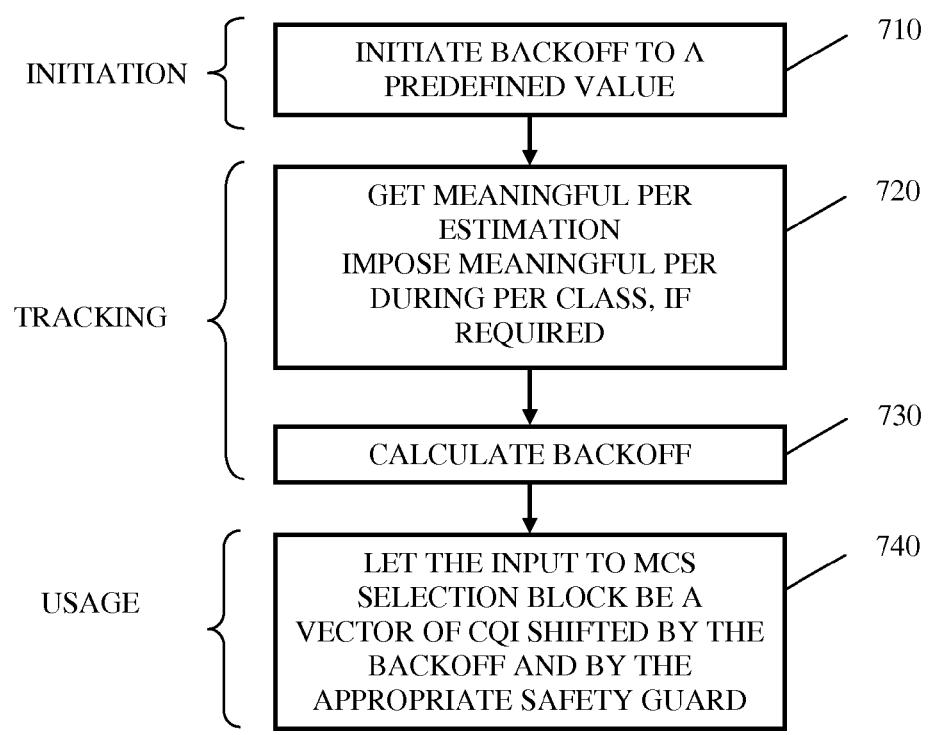
FIG. 7 is a flowchart illustration of a method for protected backoff correction of CQI according to embodiments of the present invention.

Reference is now made to FIG. 7 which is a flowchart illustration of a method for protected backoff correction of CQI according to embodiments of the present invention. Although embodiments of the invention are not limited in this respect, method depicted in FIG. 7 may be performed by embodiments of the present invention, for example, an embodiment as shown in FIG. 1.

According to embodiments of the present invention, a pre-defined value of backoff, $B_{initial}$, may be initiated, as indicated in block 710. $B_{initial}$ may be calculated in a post-production calibration process, or alternatively may be set to zero. During tracking phases, backoff B may be calculated based on the current MCS and on meaningful PER estimations which are received, for example, during PER class, as indicated in blocks 720 and 730. Alternatively, backoff B may be calculated based on substantially all PER estimations, however PER values may be imposed only during PER class. At block 740 the input to the MCS selection block may be set to vector $\{\hat{q}(t) - B - B_i\}_{i=0}^{N-1}$. For selecting the MCS of following packets in confidence level i, the $i^{th}$ entry of this vector may be used.

Figure 8:
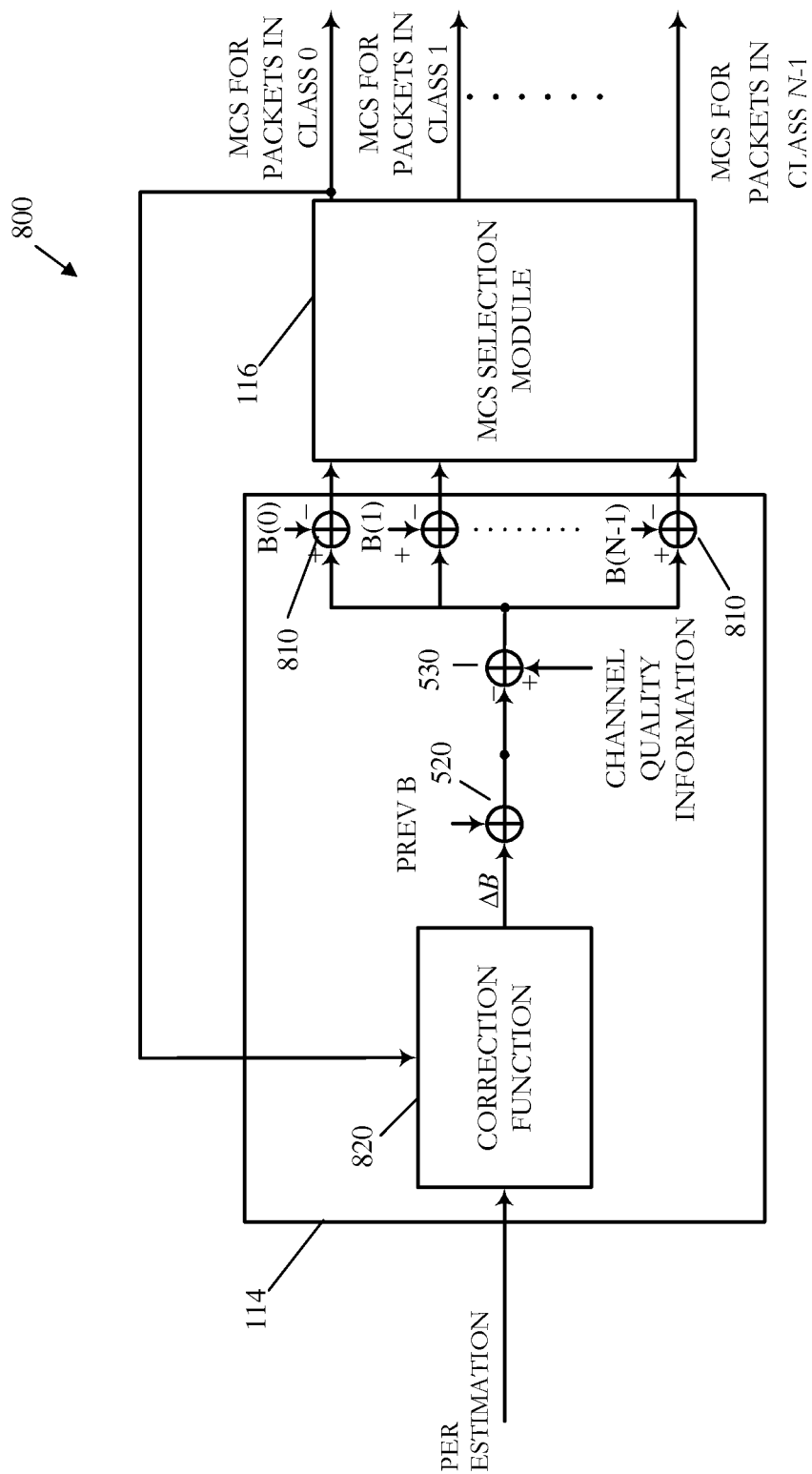
FIG. 8 schematically illustrates an exemplary block diagram of a module adapted to perform protected CLBA according to embodiments of the present invention.

Reference is made to FIG. 8 which schematically illustrates an exemplary block diagram of a module 800 adapted to perform protected CLBA according to embodiments of the present invention. Module 800 may include MCS selection module 116, and backoff adaptation module 114. Backoff adaptation module 114 may include correction function block 820 and adders 520, 530 and 810. According to embodiments of the present invention correction function block 820 may calculate backoff change $\Delta B$ based on PER estimation $\hat{p}$ which are received, for example, during PER class, and on the current MCS. Backoff change $\Delta B$ may be added to the previous value of backoff, Bprev, by adder 520 to get the current backup value, B. The backoff, B, may be subtracted from time varying value of CQI, $\hat{q}(t)$, by adder 530. Adders 810 may further subtract Safety guard $B_i$ to get $q_{corr,i}$ according to equation (4). MCS selection module 116 may get $q_{corr}$ for MCS selection. Thus, according to embodiments of the present invention the backoff shifted values of CQI are further shifted by safety guard vector, $B_i$, for packets in various confidence levels.

According to embodiments of the present invention meaningful PER estimations are received less frequently than CQI estimations. For example, CQI estimations may be received every 1-20 msec while meaningful PER estimations may be received every 1-5 seconds. Combining the relatively slowly varying backoff estimations with CQI may have the following advantages: The backoff tracking, while slower than the channel variations, is fast enough to substantially track the error or bias component in the channel quality figure. The use of $\hat{q}(t)$ may enable MCS selection module 116 to detect fast channel variations, and make an appropriate MCS selection.

Backoff, B, may have different values for different transmission modes, where transmission mode may be combination of factors such as bandwidth, e.g. 20/40 MHz in 802.11n, length of guard interval in 802.11n, whether a space/time block code (STBC) is used, etc. As known in the art, transmission mode may change rapidly. For example, according to the 802.11n standard transmission mode may change from frame to frame. According to embodiments of the present invention, the system, for example, backoff adaptation module 114, may store and track the backoff per-transmission mode such that different supported transmission modes may have different backoff values, wherein these different backoff values may be tracked and calculated during transmission in the corresponding transmission mode. During operation, CQI may be adjusted by the backoff level corresponding to the current transmission mode.

Some embodiments of the present invention may be implemented in software for execution by a processor-based system, for example, backoff adaptation module 114. For example, embodiments of the present invention may be implemented in code and may be stored on a nontransitory storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for backoff correction of channel quality information (CQI), the method comprising:
   obtaining a goodness measure estimation;
   calculating a correction factor based on said goodness measure; and
   using CQI adjusted by said correction factor for selection of modulation and coding scheme (MCS),
   wherein in a case that said goodness measure estimation substantially equals a minimal goodness measure level related to a MCS having transmission rates below a maximal supported transmission rate, imposing a goodness measure having a lower value than the goodness measure estimation, and
   wherein the calculating of the correction factor is based on said imposed goodness measure.

2. The method of claim 1 wherein said correction factor is calculated by:
   storing a plurality of tables each describing channel quality dependency on said goodness measure for one of said MCSs;
   obtaining current CQI for current MCS at substantially the same time as said goodness measure estimation;
   estimating channel quality based on said goodness measure estimation and on a table from said plurality of tables corresponding to said current MCS to get unbiased channel quality estimation; and
   calculating said correction factor by subtracting said unbiased channel quality estimation from said current CQI.

3. The method of claim 1 wherein calculating said correction factor is based on a previous value of said correction factor and on a correction function relating correction factor changes to goodness measure estimations.

4. The method of claim 3 wherein each MCS has a corresponding correction function.

5. The method of claim 3 wherein the correction function is in the form of increasing said correction factor by a first constant if said goodness measure estimation is above said first threshold, decreasing said correction factor by a second constant if said goodness measure estimation is below said second threshold and leave said correction factor unchanged otherwise.

6. The method of claim 1, wherein said goodness measure level is imposed by decreasing said correction factor.

7. The method of claim 1, wherein said goodness measure level is imposed by reducing transmission power.

8. The method of claim 7 further comprising:
   stopping to imposed said goodness measure level prior to changing said MCS; and
   reducing said correction factor by a predetermined value if said goodness measure estimation is substantially less than or equal to a minimal goodness measure level.

9. The method of claim 7, wherein said selection of MCS is performed based on CQI obtained with non-decreased transmission power.

10. The method of claim 1, further comprising:
    assigning confidence levels to packets;
    assigning a corresponding safety guard to each of said confidence levels; and
    adding said safety guard to said correction factor.

11. The method of claim 10, further comprising imposing goodness measure level in case said goodness measure estimation is substantially less than or equal to a minimal goodness measure level, while transmitting packets with low confidence level.

12. The method of claim 1, wherein said goodness measure is selectable from a list comprising: packet error rate (PER) and a combination of said PER and throughput.

13. The method of claim 1, wherein a plurality of said correction factors is calculated and used, each for a corresponding transmission mode.

14. The method of claim 1, further comprising calculating and using a plurality of said correction factors, each for a corresponding MCS.

15. The method of claim 1, further comprising filtering said correction factor.

16. The method of claim 1, further comprising setting the goodness measure to levels in which data loss is limited to pre-defined periods in which valuable data is not transmitted.

17. A system for backoff correction of channel quality information (CQI), the system comprising:
    a CQI estimation module to obtain CQI;
    a backoff adaptation module to get a goodness measure estimation and to calculate a correction factor based on said goodness measure; and
    a modulation and coding scheme (MCS) selection module to use said CQI adjusted by said correction factor for selection of MCS,
    wherein in a case that said goodness measure estimation substantially equals a minimal goodness measure level related to a MCS having transmission rates below a maximal supported transmission rate, imposing a goodness measure having a lower value than the goodness measure estimation, and
    wherein the calculating of the correction factor is based on said imposed goodness measure.

18. The system of claim 17 wherein said backoff adaptation module to calculate said correction factor by:
- storing a plurality of tables each describing channel quality dependency on said goodness measure for one of said MCSs;
- obtaining current CQI from said CQI estimation module for current MCS at substantially the same time as said goodness measure estimation;
- estimating channel quality based on said goodness measure estimation and on a table from said plurality of tables corresponding to said current MCS to get unbiased channel quality estimation; and
- calculating said correction factor by subtracting said unbiased channel quality estimation from said current CQI.

19. The system of claim 17 wherein said backoff adaptation module is further configured to calculate said correction factor based on a previous value of said correction factor and on a correction function that relates correction factor changes to goodness measure estimations.

20. The system of claim 19 wherein each MCS has a corresponding correction function.

21. The system of claim 19 wherein the correction function is in the form of increasing said correction factor by a first constant if said goodness measure estimation is above said first threshold, decreasing said correction factor by a second constant if said goodness measure estimation is below said second threshold and leave said correction factor unchanged otherwise.

22. The system of claim 17 wherein said backoff adaptation module is configured to impose said goodness measure level by decreasing said correction factor.

23. The system of claim 17 further comprising:
- at least one gain block to amplify power of at least one signal transmitted by at least one antenna according to a control signal received from said backoff adaptation module,
- wherein said backoff adaptation module to impose a goodness measure level by changing said control signal and thus changing transmission power,
- stop imposing said goodness measure level prior to changing said MCS; and
- reduce said correction factor by a predetermined value if said goodness measure estimation is substantially less than or equal to a minimal goodness measure level, when said timer expires.

24. The system of claim 23 wherein said MCS selection module to use CQI obtained with non-decreased transmission power for said selection of MCS.

25. The system of claim 17, wherein said backoff adaptation module to:
- obtain confidence levels assigned to packets;
- assign a corresponding safety guard to each of said confidence levels; and
- add said safety guard to said correction factor.

26. The system of claim 25, wherein said backoff adaptation module to impose goodness measure level in case said goodness measure estimation is substantially less than or equal to a minimal goodness measure level, while transmitting packets with low confidence level.

27. The system of claim 17, wherein said goodness measure is selectable from a list comprising: packet error rate (PER) and a combination of said PER and throughput.

28. The system of claim 17, wherein said backoff adaptation module to calculate and use a plurality of said correction factors, each for a corresponding transmission mode.

29. The system of claim 17, wherein said backoff adaptation module to calculate and use a plurality of said correction factors, each for a corresponding MCS.

30. The system of claim 17, further comprising a filter to filter said correction factor.

31. The system of claim 17, wherein said backoff adaptation module is configured to impose a goodness measure levels that may result in data loss in pre-defined periods in which valuable data is not transmitted.

* * * * *